US012257835B2

(12) United States Patent
Migita

(10) Patent No.: US 12,257,835 B2
(45) Date of Patent: Mar. 25, 2025

(54) LIQUID DISCHARGE HEAD AND LIQUID DISCHARGE APPARATUS

(71) Applicants: Hidetoshi Migita, Kanagawa (JP); Ricoh Company, Ltd., Tokyo (JP)

(72) Inventor: Hidetoshi Migita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 143 days.

(21) Appl. No.: 18/178,833

(22) Filed: Mar. 6, 2023

(65) Prior Publication Data

US 2023/0286268 A1 Sep. 14, 2023

(30) Foreign Application Priority Data

Mar. 10, 2022 (JP) ................................ 2022-037260
Dec. 2, 2022 (JP) ................................ 2022-193727

(51) Int. Cl.
*B41J 2/045* (2006.01)

(52) U.S. Cl.
CPC ....... *B41J 2/04588* (2013.01); *B41J 2/04541* (2013.01); *B41J 2/04581* (2013.01)

(58) Field of Classification Search
None
See application file for complete search history.

(56) References Cited

U.S. PATENT DOCUMENTS 6,331,040 B1 * 12/2001 Yonekubo ............ H04N 1/4057 347/15
2017/0165965 A1 * 6/2017 Misawa ............... B41J 2/04581
2020/0171819 A1 6/2020 Sohgawa
2021/0394511 A1 * 12/2021 Kusunoki ............ B41J 2/04525

FOREIGN PATENT DOCUMENTS

JP 2018-104152 6/2019
JP 2020-093535 6/2020
JP 2023-020039 2/2023

* cited by examiner

*Primary Examiner* — Scott A Richmond
(74) *Attorney, Agent, or Firm* — IPUSA, PLLC

(57) ABSTRACT

A liquid discharge head includes a nozzle layer including a piezoelectric layer and having a nozzle penetrating through the nozzle layer, a liquid chamber communicating with the nozzle, and a drive circuit to apply a drive waveform to the piezoelectric layer to drive the piezoelectric layer. The drive waveform has a first waveform and a second waveform. The first waveform has a first voltage to discharge a liquid in the liquid chamber from the nozzle. The first voltage has a first rising edge from which the first voltage rises. The second waveform has a second voltage having a second rising edge from which the second voltage rises. The second rising edge is delayed from the first rising edge by (m−0.5)×Tc, where m represents a positive integer, and Tc represents a natural period of vibration of the piezoelectric layer.

5 Claims, 10 Drawing Sheets

COMPARATIVE EXAMPLE

COMPARATIVE EXAMPLE

LIQUID DISCHARGE HEAD AND LIQUID DISCHARGE APPARATUS

CROSS-REFERENCE TO RELATED APPLICATIONS

This patent application is based on and claims priority pursuant to 35 U.S.C. § 119(a) to Japanese Patent Application Nos. 2022-037260, filed on Mar. 10, 2022, and 2022-193727, filed on Dec. 2, 2022, in the Japan Patent Office, the entire disclosure of each of which is hereby incorporated by reference herein.

BACKGROUND

Technical Field

Embodiments of the present disclosure relate to a liquid discharge head and a liquid discharge apparatus.

Related Art

In the related art, a liquid discharge head is known that employs a technique for driving a nozzle layer as an actuator to discharge a liquid from nozzles in order to arrange the nozzles in high density.

SUMMARY

Embodiments of the present disclosure describe an improved liquid discharge head that includes a nozzle layer including a piezoelectric layer and having a nozzle penetrating through the nozzle layer, a liquid chamber communicating with the nozzle, and a drive circuit to apply a drive waveform to the piezoelectric layer to drive the piezoelectric layer. The drive waveform has a first waveform and a second waveform. The first waveform has a first voltage to discharge a liquid in the liquid chamber from the nozzle. The first voltage has a first rising edge from which the first voltage rises. The second waveform has a second voltage having a second rising edge from which the second voltage rises. The second rising edge is delayed from the first rising edge by $(m-0.5)\times Tc$, where m represents a positive integer, and Tc represents a natural period of vibration of the piezoelectric layer.

According to other embodiments of the present disclosure, there is provided a liquid discharge head that includes a nozzle layer including a piezoelectric layer and having a nozzle penetrating the nozzle layer, a liquid chamber communicating with the nozzle, and a drive circuit to apply a drive waveform to the piezoelectric layer to drive the piezoelectric layer. The drive waveform has a first waveform and a second waveform. The first waveform has a first voltage to discharge a liquid in the liquid chamber from the nozzle. The first voltage has a rising edge from which the first voltage rises. The second waveform has a second voltage having a falling edge from which the second voltage falls. The falling edge is delayed from the rising edge by $n\times Tc$, where n represents a positive integer, and Tc represents a natural period of vibration of the piezoelectric layer.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
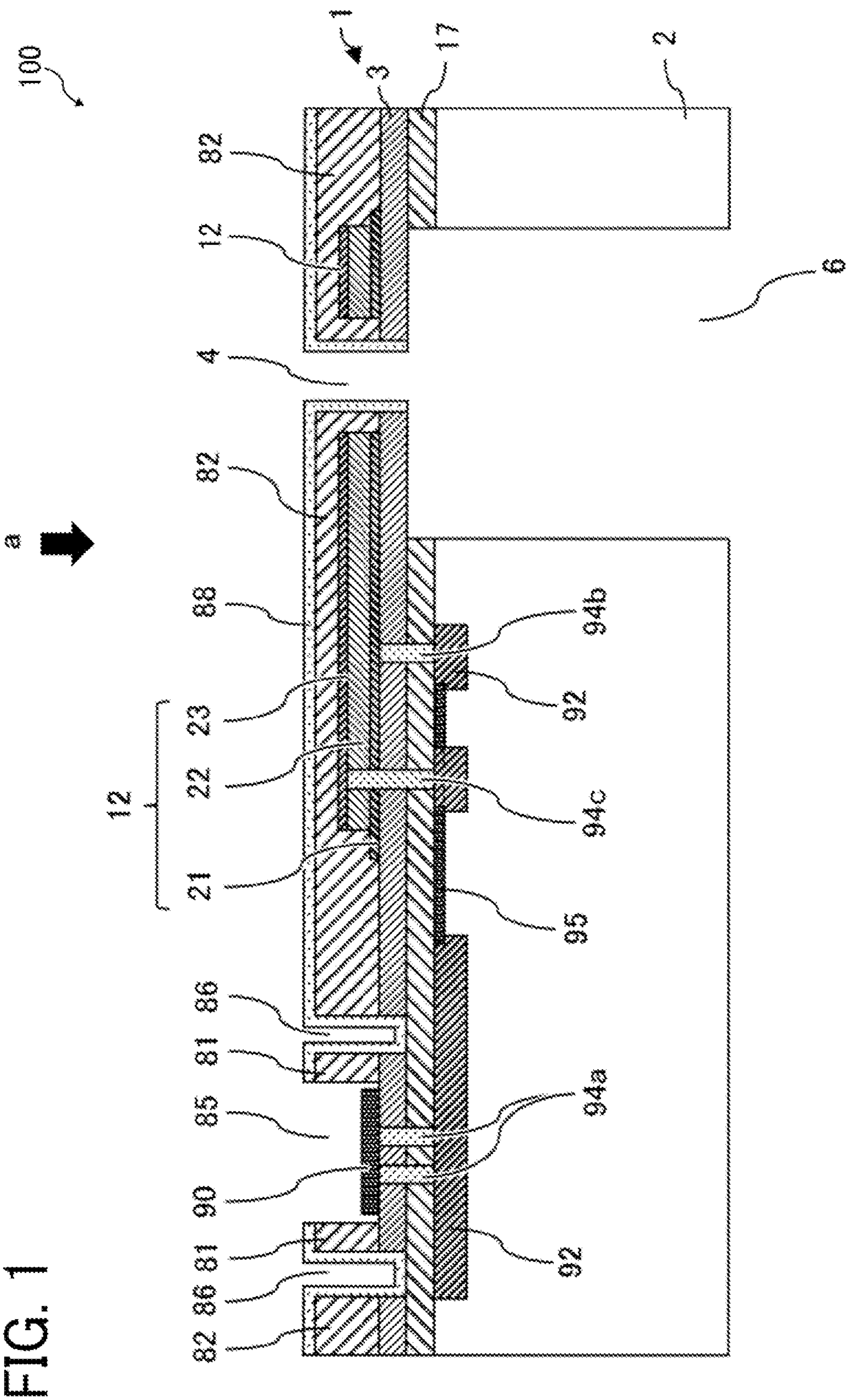
FIG. 1 is a schematic cross-sectional view of a liquid discharge head according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Embodiments of the present disclosure are described below with reference to the drawings. It is to be noted that the following embodiments are not limiting the present disclosure and any deletion, addition, modification, change, etc. can be made within a scope in which person skilled in the art can conceive including other embodiments, and any of which is included within the scope of the present disclosure as long as the effect and feature of the present disclosure are exhibited. In each of the drawings, the same reference codes are allocated to components and portions having the same structure or functions, and redundant descriptions thereof may be omitted.

Liquid Discharge Head

Figure 2:
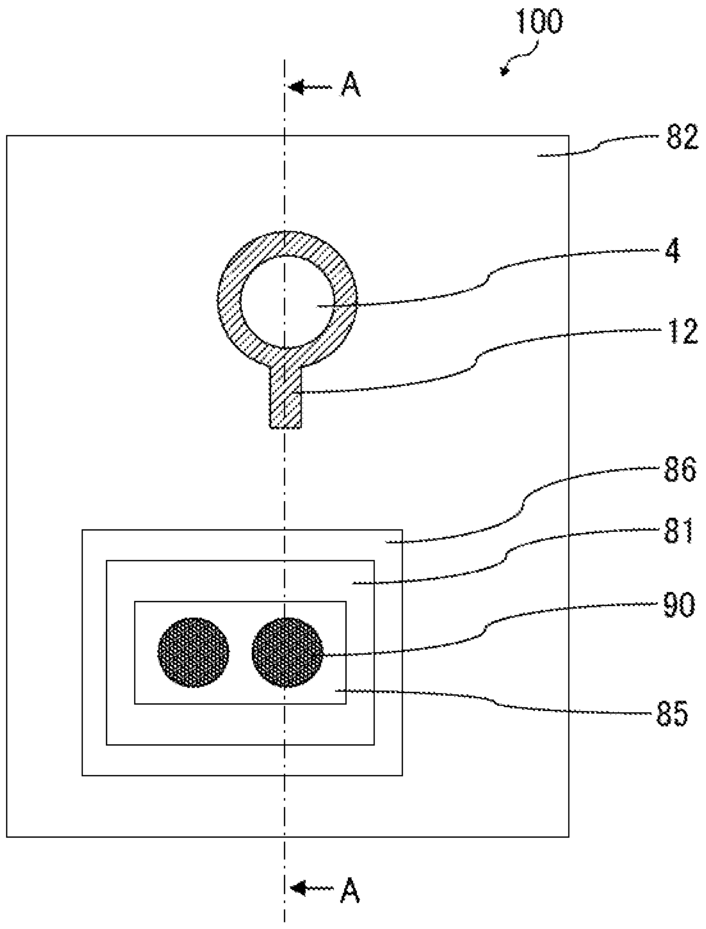
FIG. 2 is a schematic plan view of the liquid discharge head.

FIG. 1 is a schematic cross-sectional view of a liquid discharge head 100 according to embodiments of the present disclosure. FIG. 2 is a schematic plan view of the liquid discharge head 100 as viewed from a nozzle surface side (also referred to as a liquid discharge side from which liquid is discharged). That is, the liquid discharge head 100 illustrated in FIG. 2 is viewed in the direction indicated by arrow a in FIG. 1, and FIG. 1 is the schematic cross-sectional view taken along line A-A in FIG. 2. As illustrated in FIG. 1, the liquid discharge head 100 according to the present embodiment includes a nozzle layer 1, a liquid chamber substrate 2, and a drive circuit 92.

The nozzle layer 1 includes a diaphragm layer 3, a piezoelectric actuator 12 as a piezoelectric layer, an electrode pad 90, a first protective layer 81, and a second protective layer 82. The electrode pad 90 is an example of a circuit connection. The nozzle layer 1 has a nozzle 4 penetrating the nozzle layer 1, and a liquid (for example, ink) is discharged from the nozzle 4. The liquid chamber substrate 2 and a part of the nozzle layer 1 define a liquid chamber 6, and the piezoelectric actuator 12 is driven by the drive circuit 92 to discharge the liquid in the liquid chamber 6 from the nozzle 4.

The diaphragm layer 3 vibrates when the piezoelectric actuator 12 is driven. The material of the diaphragm layer 3 is not particularly limited, and for example, aluminum oxide (Al2O3), silicon nitride (SiN), silicon dioxide (SiO2), high temperature oxide (HTO), or a combination of some of these materials that are laminated one on another can be used.

The liquid chamber substrate 2 includes the liquid chamber 6 communicating with the nozzle 4. A circuit protective layer 17 is disposed between the liquid chamber substrate 2 and the diaphragm layer 3. The circuit protective layer 17 protects the drive circuit 92 and an inter-layer wiring layer 95.

The material of the circuit protective layer 17 is not particularly limited, and examples thereof include a polytetrafluoroethylene (PTFE)-based resin. A position where the circuit protective layer 17 is formed is not particularly limited, and for example, the circuit protective layer 17 is formed so as to cover the drive circuit 92 and the inter-layer wiring layer 95. The nozzle layer 1 may include the circuit protective layer 17, or the liquid chamber substrate 2 may include the circuit protective layer 17.

The piezoelectric actuator 12 includes a lower electrode 21, a piezoelectric body 22, and an upper electrode 23. The lower electrode 21 may be a common electrode and the upper electrode 23 may be an individual electrode. Alternatively, the lower electrode 21 may be the individual electrode and the upper electrode 23 may be the common electrode.

The material of the piezoelectric body 22 is not particularly limited, and for example, lead zirconate titanate (PZT) can be used. The materials of the lower electrode 21 and the upper electrode 23 are not particularly limited, and known electrode materials can be used. For example, platinum (Pt) may be used.

The piezoelectric actuator 12 (the piezoelectric body 22) is disposed adjacent to the nozzle 4 and over a side (first side) of the diaphragm layer 3 from which a liquid is discharged (i.e., the nozzle surface side). In the present embodiment, the piezoelectric actuator 12 is disposed on the diaphragm layer 3. Since the piezoelectric actuator 12 is disposed at such a position, a diaphragm plate is unnecessary, which applies pressure to a liquid sucked and introduced into the liquid chamber 6 to discharge the liquid from the nozzle 4.

The piezoelectric actuator 12 is connected to the drive circuit 92 to drive the piezoelectric actuator 12, via connection electrodes 94*b* and 94*c*. For example, the lower electrode 21 is connected to the drive circuit 92 via the connection electrode 94*b*, and the upper electrode 23 is connected to the drive circuit 92 via the connection electrode 94*c*.

The drive circuit 92 is connected to the electrode pad 90 via a connection electrode 94*a*, and is energized from a power supply unit via the electrode pad 90 and the connection electrode 94*a*. The drive circuit 92 is disposed over a side (second side) opposite to the side (first side) where the electrode pad 90 is disposed across the diaphragm layer 3. The drive circuit 92 is preferably disposed, but not limited to, on the liquid chamber substrate 2. In such a case, the drive circuit 92 can be easily formed.

The drive circuit 92 is not particularly limited, but may be, for example, a complementary metal oxide semiconductor (CMOS) circuit. Although not particularly limited, the drive circuit 92 is divided into multiple portions connected to the electrode pad 90 and connected to the piezoelectric actuator 12 as illustrated in FIG. 1, and the multiple portions are connected to each other via the inter-layer wiring layer 95. As the material of the inter-layer wiring layer 95, for example, a known electrode material can be used.

The electrode pad 90 (i.e., the circuit connection) is disposed over the liquid discharge side (nozzle surface side) of the diaphragm layer 3, and is connected to the drive circuit 92 via the connection electrode 94*a*. Here, two connection electrodes 94*a* are illustrated in FIG. 1, but the number of the connection electrodes 94*a* is not limited to two. The two connection electrodes 94*b* and 94*c* connected to the lower electrode 21 and the upper electrode 23 of the piezoelectric actuator 12 correspond to the two connection electrodes 94*a*, respectively.

As illustrated in FIG. 1, in the present embodiment, the first and second protective layers 81 and 82 are disposed over the liquid discharge side (nozzle surface side) of the diaphragm layer 3. The first protective layer 81 is disposed around the electrode pad 90 and defines an opening 85 above the electrode pad 90. The second protective layer 82 is disposed over the piezoelectric actuator 12. The first protective layer 81 and the second protective layer 82 can protect, for example, at least one of the piezoelectric actuator 12 or the diaphragm layer 3, thereby preventing deterioration of these components.

The liquid discharge head 100 according to the present embodiment includes a water-resistant film 88 disposed over the surface of the first protective layer 81 and the surface of the second protective layer 82. The water-resistant film 88 can prevent moisture from permeating into the first and second protective layers 81 and 82. Therefore, the piezoelectric actuator 12 is prevented from deteriorating in performance due to the moisture permeating through the second protective layer 82. The water-resistant film 88 is omitted in FIG. 2 for simplicity.

In the present embodiment, the first protective layer 81 and the second protective layer 82 are not continuous. As illustrated in FIG. 1, the first protective layer 81 and the second protective layer 82 are separated from each other by a separation groove 86. That is, the first protective layer 81 and the second protective layer 82 are discontinuous. With such a structure, in the liquid discharge head 100 in which the piezoelectric actuator 12 and the electrode pad 90 (circuit connection) are formed in the nozzle layer 1, the piezoelectric actuator 12 is prevented from absorbing moisture from the opening 85 above the electrode pad 90, thereby preventing the deterioration of piezoelectric performance of the piezoelectric actuator 12.

The liquid discharge head 100 according to the present embodiment is not limited to the above-described configuration. The liquid discharge head 100 according to the present embodiment includes at least the nozzle layer 1 including the piezoelectric layer (the piezoelectric actuator 12), the nozzle 4 penetrating the nozzle layer 1, the liquid chamber 6 communicating with the nozzle 4, and the drive circuit 92 that applies the drive waveform to the piezoelectric layer to drive the piezoelectric layer, and may not include other components described with reference to FIGS. 1 and 2.

A drive waveform used by the liquid discharge head 100 according to the present embodiment is described below. When a liquid discharge head that does not includes an individual liquid chamber discharges a liquid and a residual vibration is generated in the nozzle layer 1, a drive waveform according to the present embodiment reduces the residual vibration. If the residual vibration is generated in the nozzle layer 1 after the liquid is discharged, the speed of the liquid to be subsequently discharged may fluctuate, causing an abnormal image.

The drive waveform applied to the piezoelectric layer by the drive circuit 92 has a first waveform and a second waveform. The first waveform is a waveform portion of the drive waveform having a first voltage applied to the piezoelectric layer as a drive voltage to discharge a liquid from the nozzle 4. The second waveform is a waveform portion of the drive waveform having a second voltage applied to the piezoelectric layer to reduce the residual vibration generated in the nozzle layer 1. The first voltage is preferably has a larger amplitude than the second voltage.

In the drive waveform according to the present embodiment, the second voltage is applied at a predetermined timing with respect to a rising edge (positive edge) of the first voltage. More specifically, in the drive waveform, a falling edge (negative edge) or the rising edge of the second voltage is applied at a predetermined timing with respect to the rising edge of the first voltage.

The predetermined timing is calculated based on the timing at which the rising edge of the first voltage is applied and a natural vibration period. The predetermined timing may be calculated each time the drive waveform is applied to the liquid discharge head 100, or may be calculated in advance at the time of manufacturing the liquid discharge head 100 and stored in a memory or the like in the liquid discharge head 100. Further, a drive waveform having the calculated predetermined timing may be stored in a memory or the like.

The natural vibration period is a natural period of vibration of the first (fundamental) mode of the piezoelectric layer when the liquid chamber 6 and the nozzle 4 are filled with the liquid. In the following description, the natural vibration period is referred to as "Tc" as appropriate.

Such a drive waveform can reduce the residual vibration generated in the nozzle layer 1 without new additional mechanical components. The drive waveform is described below in detail in each embodiment. A waveform has multiple elements such as a voltage to be applied, and the voltage has a leading edge (or slope), and a trailing edge (slope). The leading edge may be the rising edge in which the voltage rises (i.e., positively changes), and the trailing edge may be the falling edge in which the voltage falls (i.e., negatively changes). Alternatively, the leading edge may be the falling edge, and the trailing edge may be the rising edge.

First Embodiment

Figure 3:
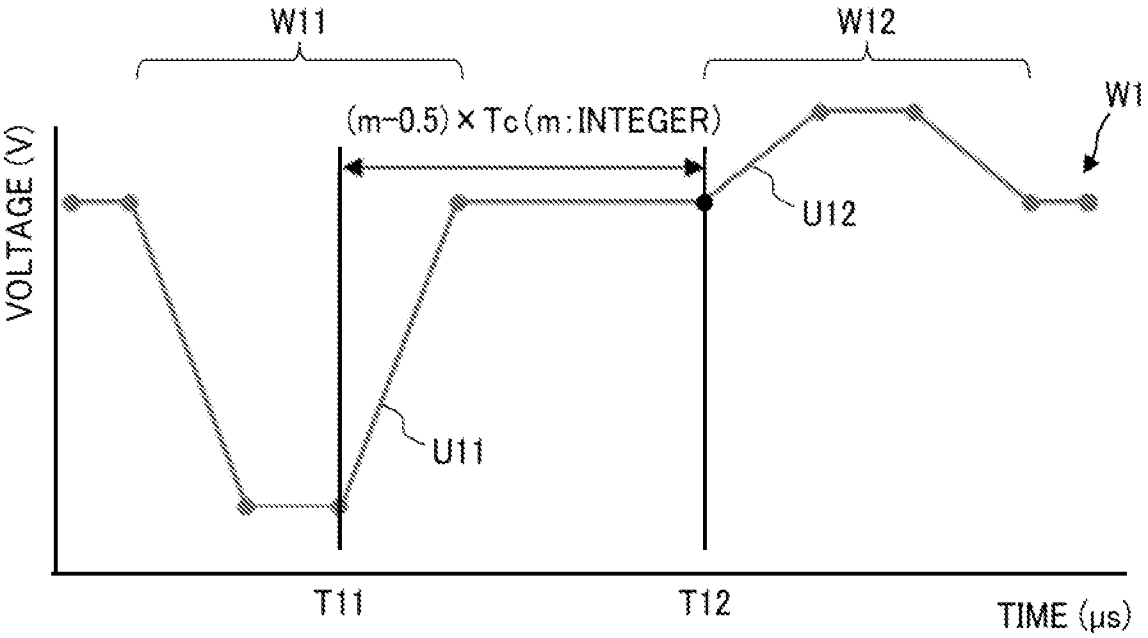
FIG. 3 is a graph illustrating an example of a drive waveform according to a first embodiment of the present disclosure.

FIG. 3 is a graph illustrating an example of the drive waveform according to a first embodiment of the present disclosure. FIG. 3 schematically illustrates the drive waveform. The vertical axis represents voltage (V), and the horizontal axis represents time (μs).

The drive waveform W1 has a first waveform W11 having a first voltage and a second waveform W12 having a second voltage. The first voltage has a first rising edge U11 (trailing edge). The second voltage has a second rising edge U12 (leading edge) at a timing T12 delayed from the first rising edge U11 by (m−0.5)×Tc, where m represents a positive integer.

Preferably, the second waveform W12 has an amplitude of the second voltage smaller than an amplitude of the first voltage of the first waveform W11. Preferably, the direction of the amplitude of the second waveform W12 is opposite to the direction of the amplitude of the first waveform W11. The second waveform W12 is preferably applied next to the first waveform W11 so that the second rising edge U12 of the second waveform W12 is delayed from the first rising edge U11 of the first waveform W11.

When a PZT element is used for the piezoelectric body 22 as a drive element, the piezoelectric body 22 can be driven by a waveform having an amplitude within the range of voltages of the same polarity (for example, positive voltages). Alternatively, when the piezoelectric body 22 may be made of aluminum nitride, the piezoelectric body 22 can be driven by a waveform having an amplitude varying between the positive and negative voltages (opposite polarities).

As illustrated in FIG. 3, the second rising edge U12 of the second voltage is delayed from the first rising edge U11 of the first voltage by an interval of (m−0.5)×Tc, where m represents a positive integer. The first rising edge U11, in which the voltage positively changes, is one of the multiple elements of the first waveform W11, and the second rising edge U12, in which the voltage also positively changes (i.e., the same voltage change as the first rising edge U11), is one of the multiple elements of the second waveform W12.

In FIG. 3, the interval between a timing T11 at which the first rising edge U11 starts and the timing T12 at which the second rising edge U12 starts is (m−0.5)×Tc. Alternatively, in the drive waveform W1, the timing T12 at which the second rising edge U12 starts may be delayed from an arbitrary timing between the start and end of the first rising edge U12 (within the slope of the first rising edge U11 in FIG. 3) by the interval of (m−0.5)×Tc.

Figure 4A:
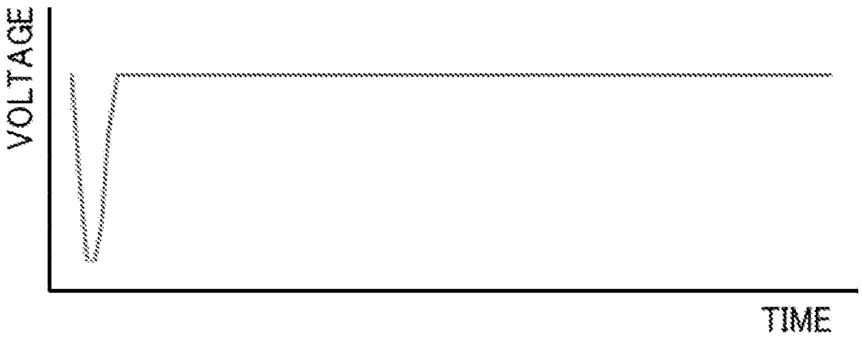
FIG. 4A is a graph of the drive waveform according to a comparative example.
Figure 4B:
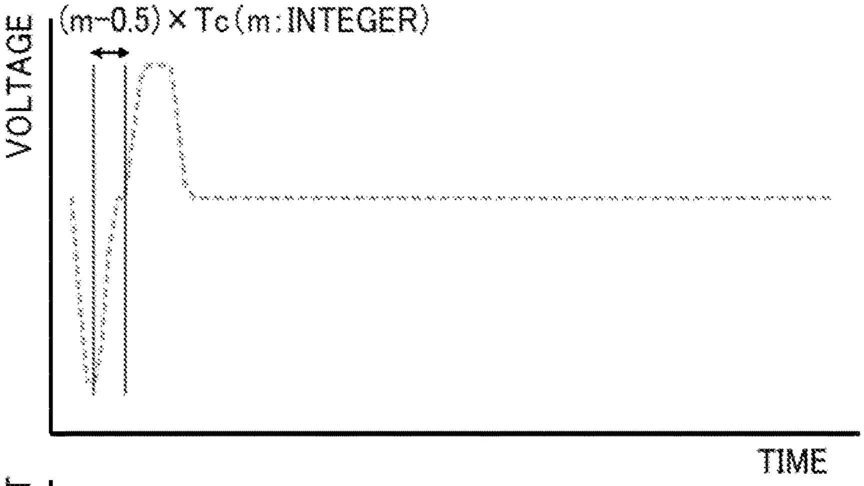
FIG. 4B is a graph of the drive waveform according to the first embodiment.
Figure 4C:
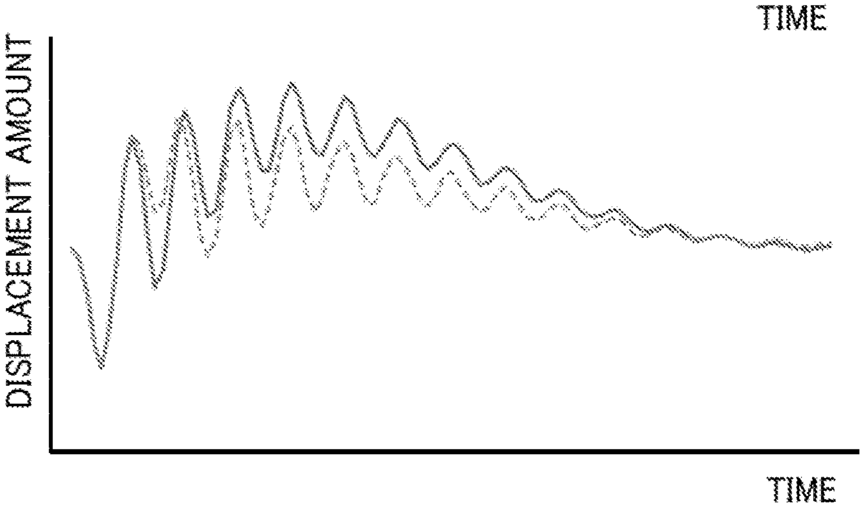
FIG. 4C is a graph of meniscus displacement when the drive waveforms of the comparative example and the first embodiment are applied, illustrating an effect of the drive waveform of the first embodiment.

Effects of the drive waveform according to the present embodiment is described. FIG. 4A is a graph of a drive waveform according to a comparative example. FIG. 4B is a graph of a drive waveform according to the first embodiment. FIG. 4C is a graph of meniscus displacement when the drive waveforms of the comparative example and the first embodiment are applied, illustrating an effect of the drive waveform of the first embodiment. In FIGS. 4A to 4C, values of the comparative example are indicated by solid lines, and values of the present embodiment are indicated by broken lines.

The meniscus displacement (i.e., a displacement of meniscus of the liquid in the nozzle 4) corresponds to the residual vibration of the nozzle layer 1. The residual vibration can be reduced by the drive waveform according to the present embodiment. In the liquid discharge head 10 illustrated in FIG. 1, the residual vibration is generated in the nozzle layer 1 after the liquid is discharged from the nozzle 4.

With the drive waveform W1 illustrated in FIG. 3, the drive circuit 92 applies the second rising edge U12 to the piezoelectric actuator 12 at the timing T12 delayed from the first rising edge U11 by (m−0.5)×Tc. As a result, the liquid discharge head 100 cancels the vibration generated by discharging the liquid, thereby reducing the residual vibration generated in the nozzle layer 1. Specifically, the nozzle layer 1 has the nozzle 4 from which the liquid is discharged and includes the piezoelectric actuator 12, and the nozzle layer 1 around the nozzle 4 is driven (vibrated) together with the piezoelectric actuator 12.

Accordingly, since the nozzle layer 1 is driven (vibrated) by the drive waveform W1 according to the present embodiment, the liquid discharge head 100 can discharge the liquid with high accuracy. As described above, the drive waveform W1 reduces the residual vibration generated in the nozzle layer 1.

Figure 5:
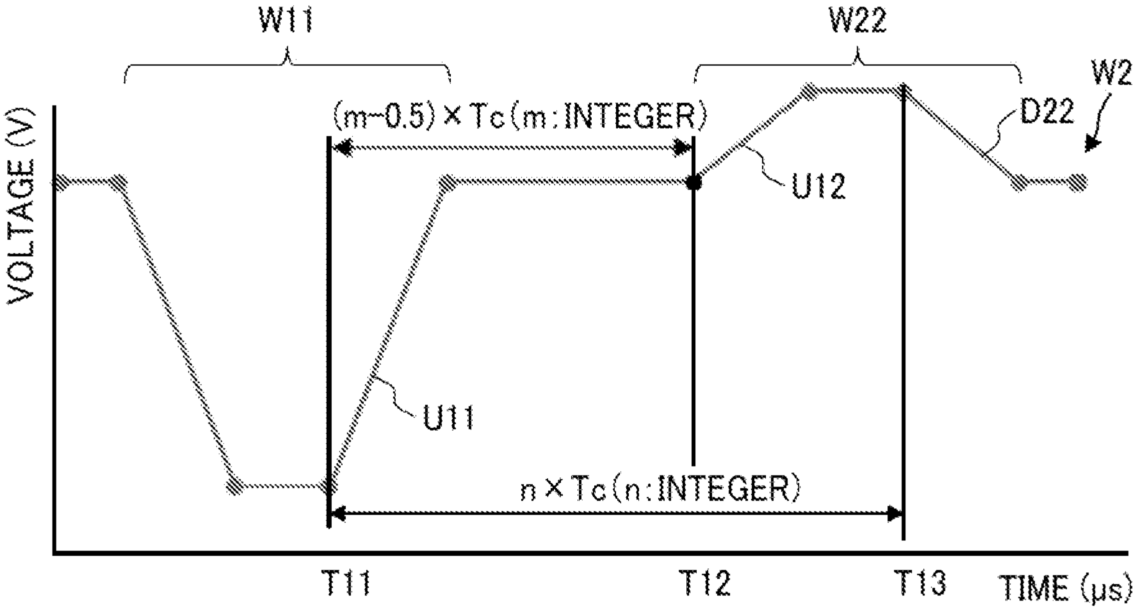
FIG. 5 is a graph illustrating another example of the drive waveform according to the first embodiment.

As illustrated in FIG. 5, a drive waveform W2 preferably has a falling edge D22 of a second waveform W22 at a timing T13 delayed from the first rising edge U11 of the first waveform W11 by an interval of n×Tc, where n represents a positive integer. That is, the falling edge D22 of the second voltage is delayed from the first rising edge U11 of the first voltage by the interval of n×Tc. In the falling edge D22, the voltage negatively changes, which is different from the voltage change (i.e., positive change) in the first rising edge U11. The interval of n×Tc is larger than the interval of (m−0.5)×Tc, that is, n×Tc>(m−0.5)×Tc.

Second Embodiment

Figure 6:
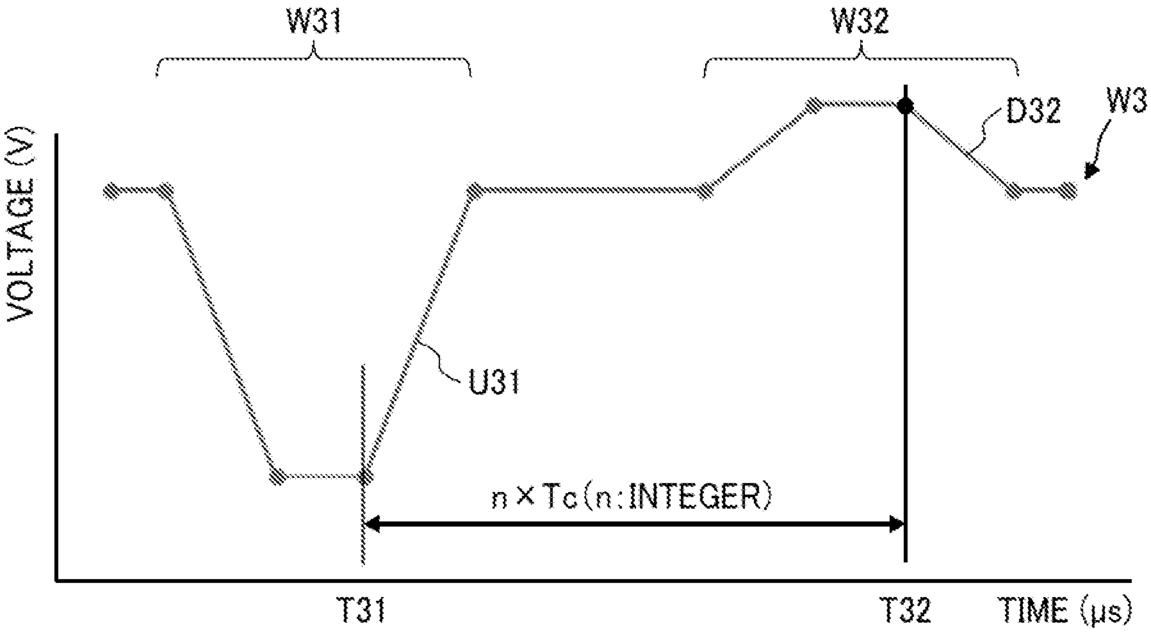
FIG. 6 is a graph illustrating an example of the drive waveform according to a second embodiment of the present disclosure.

FIG. 6 is a graph illustrating an example of the drive waveform according to a second embodiment of the present disclosure. Similarly to FIG. 3, FIG. 6 schematically illustrates the drive waveform. A drive waveform W3 has a falling edge D32 of a second waveform W32 at a timing T32 delayed from a first rising edge U31 of a first waveform W31 by the interval of n×Tc, where n represents a positive integer.

The voltage and direction (positive or negative) of the amplitude of the second waveform W32 may be the same as those in the first embodiment. Similarly to the first embodiment, when the PZT element is used for the piezoelectric body 22 as a drive element, the piezoelectric body 22 can be driven by a waveform having an amplitude within the range of voltages of the same polarity, and when the aluminum nitride is used for the piezoelectric body 22, the piezoelectric body 22 can be driven by a waveform having an amplitude varying between the positive and negative voltages.

As illustrated in FIG. 6, the falling edge D32 of the second voltage is delayed from the first rising edge U31 of the first voltage by the interval of n×Tc. In the falling edge D32, the voltage negatively changes, which is different from the voltage change (i.e., positive change) in the first rising edge U31.

In FIG. 6, the interval between a timing T31 at which the first rising edge U31 starts and the timing T32 at which the falling edge D32 starts is n×Tc. Alternatively, in the drive waveform W3, the timing T32 at which the falling edge D32 starts may be delayed from an arbitrary timing between the start and end of the first rising edge U31 (within the slope of the first rising edge U31 in FIG. 6) by the interval of n×Tc.

Figure 7A:
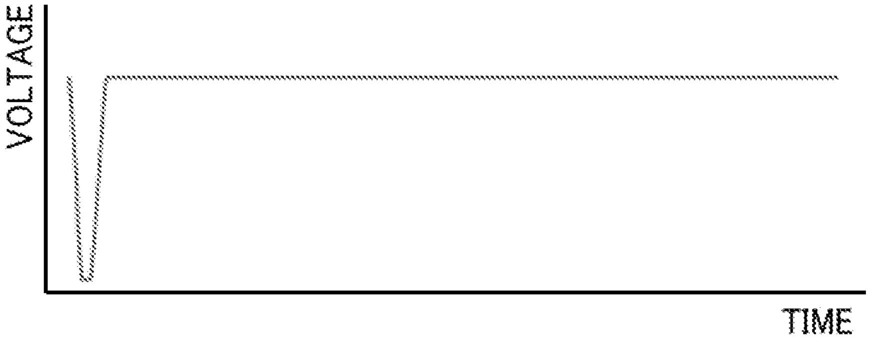
FIG. 7A is a graph of the drive waveform according to the comparative example.
Figure 7B:
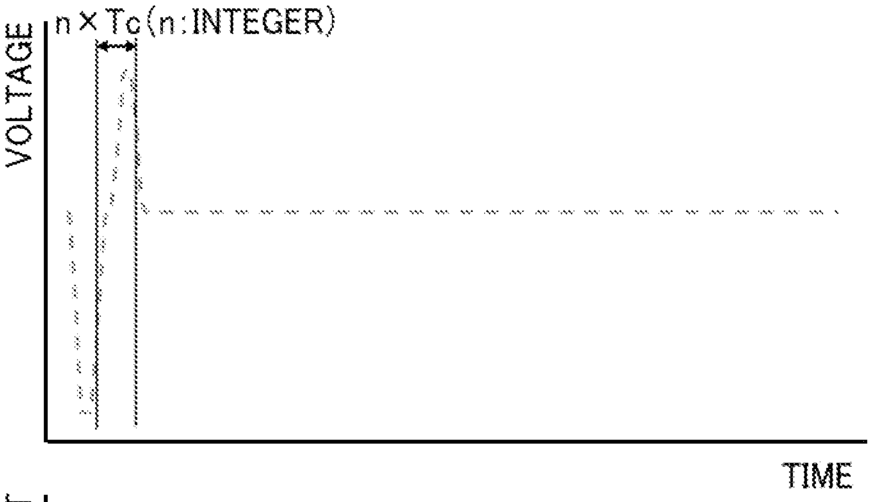
FIG. 7B is a graph of the drive waveform according to the second embodiment.
Figure 7C:
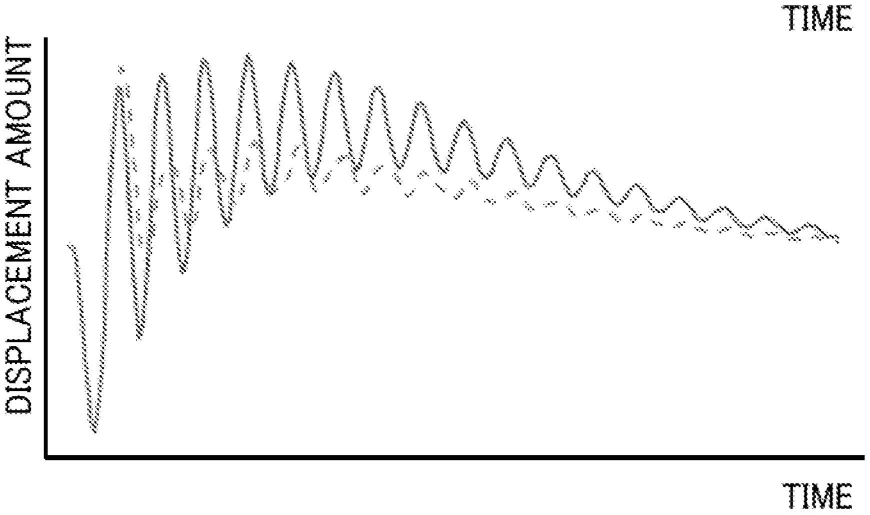
FIG. 7C is a graph of meniscus displacement when the drive waveforms of the comparative example and the second embodiment are applied, illustrating an effect of the drive waveform of the second embodiment.

Effects of the drive waveform according to the present embodiment is described. FIG. 7A is a graph of the drive waveform according to the comparative example. FIG. 7B is a graph of a drive waveform according to the second embodiment. FIG. 7C is a graph of meniscus displacement when the drive waveforms of the comparative example and the second embodiment are applied, illustrating an effect of the drive waveform of the second embodiment. In FIGS. 7A to 7C, values of the comparative example are indicated by solid lines, and values of the present embodiment are indicated by broken lines. In the liquid discharge head 10 illustrated in FIG. 1, the residual vibration is generated in the nozzle layer 1 after the liquid is discharged from the nozzle 4.

With the drive waveform W3 illustrated in FIG. 6, the drive circuit 92 applies the falling edge D32 to the piezoelectric actuator 12 at the timing T32 delayed from the first rising edge U31 by n×Tc. As a result, the liquid discharge head 100 cancels the vibration generated by discharging the liquid, thereby reducing the residual vibration generated in the nozzle layer 1. As described above, the drive waveform W3 reduces the residual vibration generated in the nozzle layer 1.

Other Embodiment

The second waveform in each of the above embodiments preferably has an amplitude of the second voltage equal to or less than, for example, 50% of an amplitude of the first voltage of the first waveform.

In each of the above-described embodiments, the drive waveform may have multiple second waveforms including the second waveform after the first waveform so that the second waveform is repeatedly applied. Each of the multiple second waveforms may have, for example, the same voltage.

Figure 8:
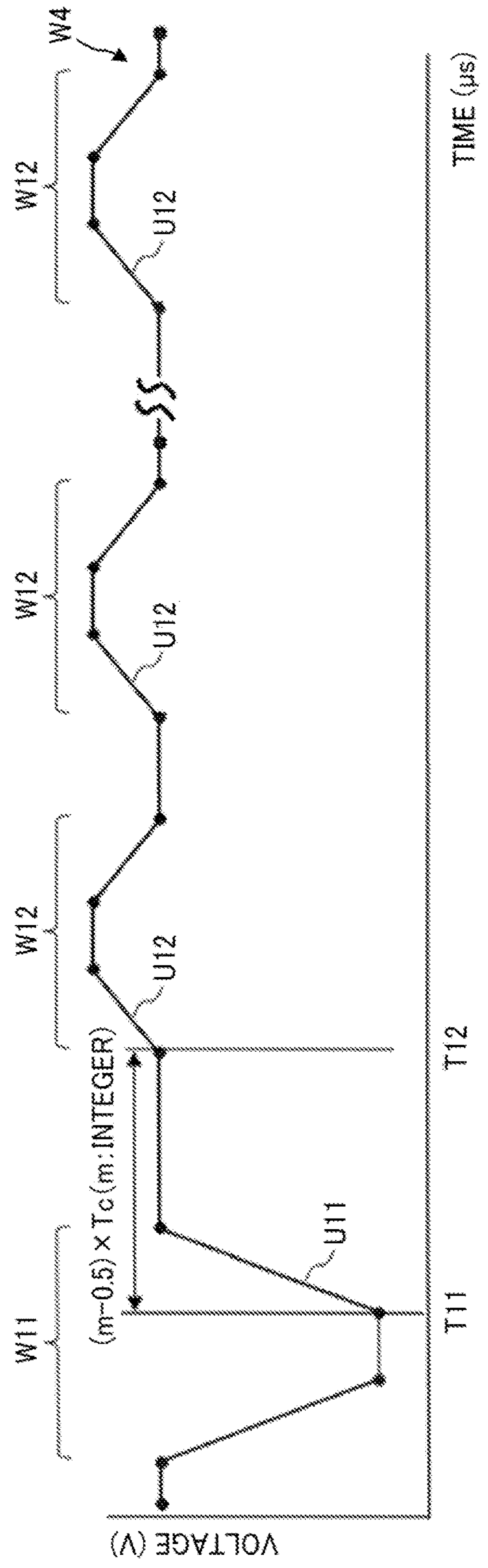
FIG. 8 is a graph illustrating an example of the drive waveform having multiple second waveforms.

FIG. 8 illustrates an example of a drive waveform W4 in which multiple second waveforms W12 are added to the drive waveform W1 illustrated in FIG. 3 according to the first embodiment, and the second waveform W12 is repeatedly applied after the first waveform W11. Similarly, multiple second waveforms W22 or multiple second waveforms W32 may be added to the drive waveform W2 illustrated in FIG. 5 or the drive waveform W3 illustrated in FIG. 6 so that the second waveform W22 or W32 is repeatedly applied after the first waveform W11 or W31.

In each of the above-described embodiments, when the nozzle layer 1 having the nozzle 4 includes a vibration source (i.e., the piezoelectric actuator 12), the residual vibration can be effectively reduced.

Liquid Discharge Apparatus and Liquid Discharge Device

Figure 9:
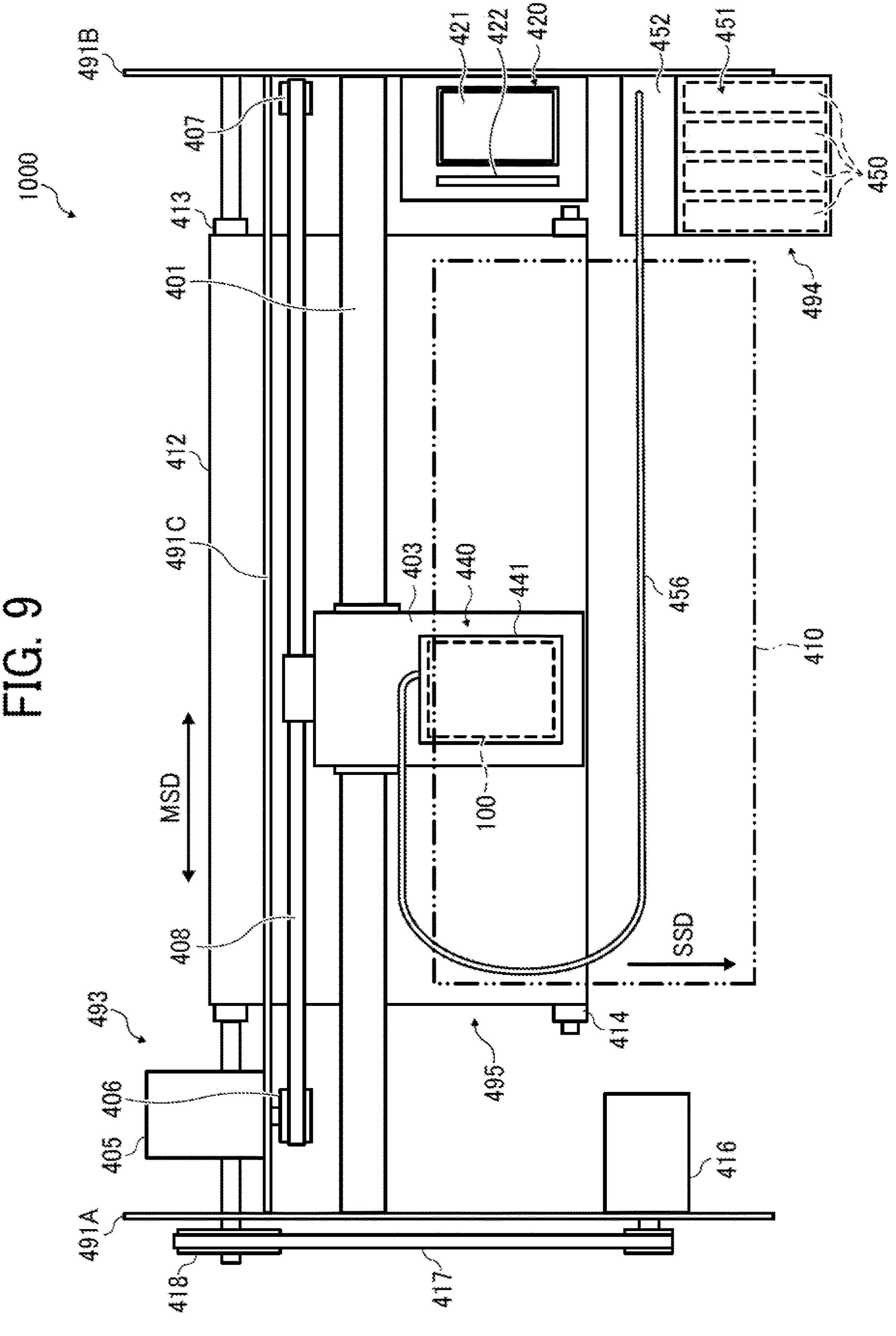
FIG. 9 is a schematic plan view of a portion of a liquid discharge apparatus according to embodiments of the present disclosure.
Figure 10:
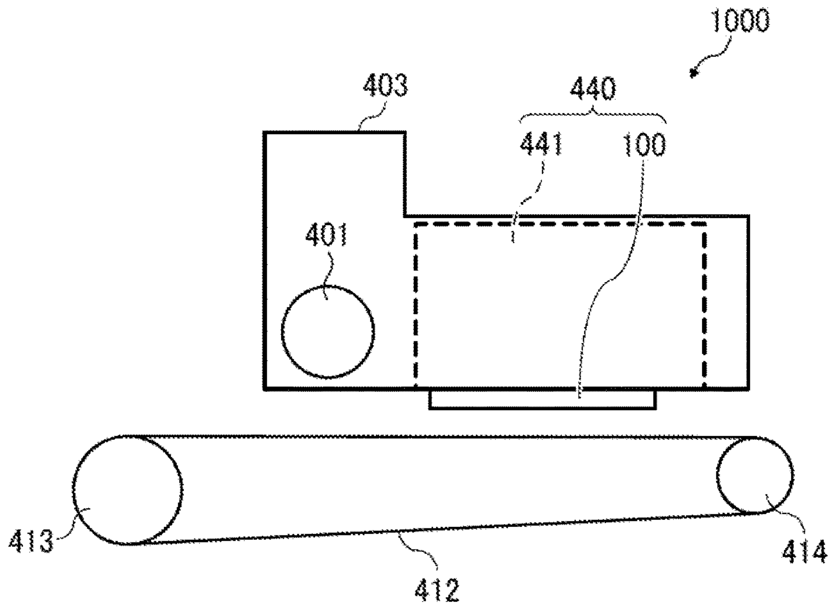
FIG. 10 is a schematic side view of the portion of the liquid discharge apparatus in FIG. 9.

Next, an example of a liquid discharge apparatus according to the present embodiment is described with reference to FIGS. 9 and 10. FIG. 9 is a plan view of a portion of a liquid discharge apparatus 1000. FIG. 10 is a side view of the portion of the liquid discharge apparatus 1000 in FIG. 9.

The liquid discharge apparatus 1000 is a serial-type apparatus in which a main-scanning moving mechanism 493 reciprocates a carriage 403 in the main scanning directions indicated by arrow MSD in FIG. 9. The main-scanning moving mechanism 493 includes a guide 401, a main-scanning motor 405, and a timing belt 408. The guide 401 is bridged between left and right side plates 491A and 491B to moveably hold the carriage 403. The main-scanning motor 405 reciprocates the carriage 403 in the main scanning direction via the timing belt 408 looped around a drive pulley 406 and a driven pulley 407 to move the liquid discharge head 100 relative to a sheet 410.

The carriage 403 mounts a liquid discharge device 440 including the liquid discharge head 100 according to the above described embodiments of the present disclosure and a head tank 441 as a single integrated unit. The liquid discharge head 100 of the liquid discharge device 440 discharges color liquids of, for example, yellow (Y), cyan (C), magenta (M), and black (K). The liquid discharge head 100 is mounted on the liquid discharge device 440 of the carriage 403 such that a nozzle row including a plurality of nozzles 4 is arranged in the sub-scanning direction perpendicular to the main scanning direction. The liquid discharge head 100 discharges the color liquid downward.

A supply mechanism 494 disposed outside the liquid discharge head 100 supplies a liquid stored in liquid cartridges 450 to the head tank 441 to supply the liquid to the liquid discharge head 100. The supply mechanism 494 includes a cartridge holder 451 which is a filling part to mount the liquid cartridges 450, a tube 456, a liquid feed unit 452 including a liquid feed pump, and the like. The liquid cartridge 450 is detachably mounted on the cartridge holder 451. The liquid feed unit 452 feeds the liquid from the liquid cartridge 450 to the head tank 441 via the tube 456.

The liquid discharge apparatus 1000 further includes a conveyance mechanism 495 to convey the sheet 410. The conveyance mechanism 495 includes a conveyance belt 412 as a conveyor and a sub-scanning motor 416 to drive the conveyance belt 412. The conveyance belt 412 attracts the sheet 410 and conveys the sheet 410 to a position facing the liquid discharge head 100. The conveyance belt 412 is an endless belt stretched between a conveyance roller 413 and a tension roller 414 as illustrated in FIG. 10. The sheet 410 can be attracted to the conveyance belt 412 by electrostatic attraction, air suction, or the like. The conveyance belt 412 circumferentially moves in the sub-scanning direction indicated by arrow SSD in FIG. 10 as the conveyance roller 413 is rotationally driven by the sub-scanning motor 416 via a timing belt 417 and a timing pulley 418.

On one side of the carriage 403 in the main scanning direction, a maintenance mechanism 420 that maintains and recovers the liquid discharge head 100 is disposed lateral to the conveyance belt 412. The maintenance mechanism 420 includes, for example, a cap 421 to cap the nozzle surface (i.e., the surface on which the nozzles 4 are formed) of the liquid discharge head 100 and a wiper 422 to wipe the nozzle surface.

The main-scanning moving mechanism 493, the supply mechanism 494, the maintenance mechanism 420, and the conveyance mechanism 495 are mounted onto a housing including the side plates 491A and 491B and a back plate 491C. In the liquid discharge apparatus 1000 having the above-described configuration, the sheet 410 is fed and attracted onto the conveyance belt 412 and conveyed in the sub-scanning direction indicated by arrow SSD as the conveyance belt 412 circumferentially moves.

The liquid discharge head 100 is driven in response to an image signal while moving the carriage 403 in the main scanning direction to discharge liquid onto the sheet 410 not in motion, thereby forming an image. As described above, the liquid discharge apparatus 1000 includes the liquid discharge head 100 according to the above-described embodiments of the present disclosure, thus allowing stable formation of high-quality images.

Figure 11:
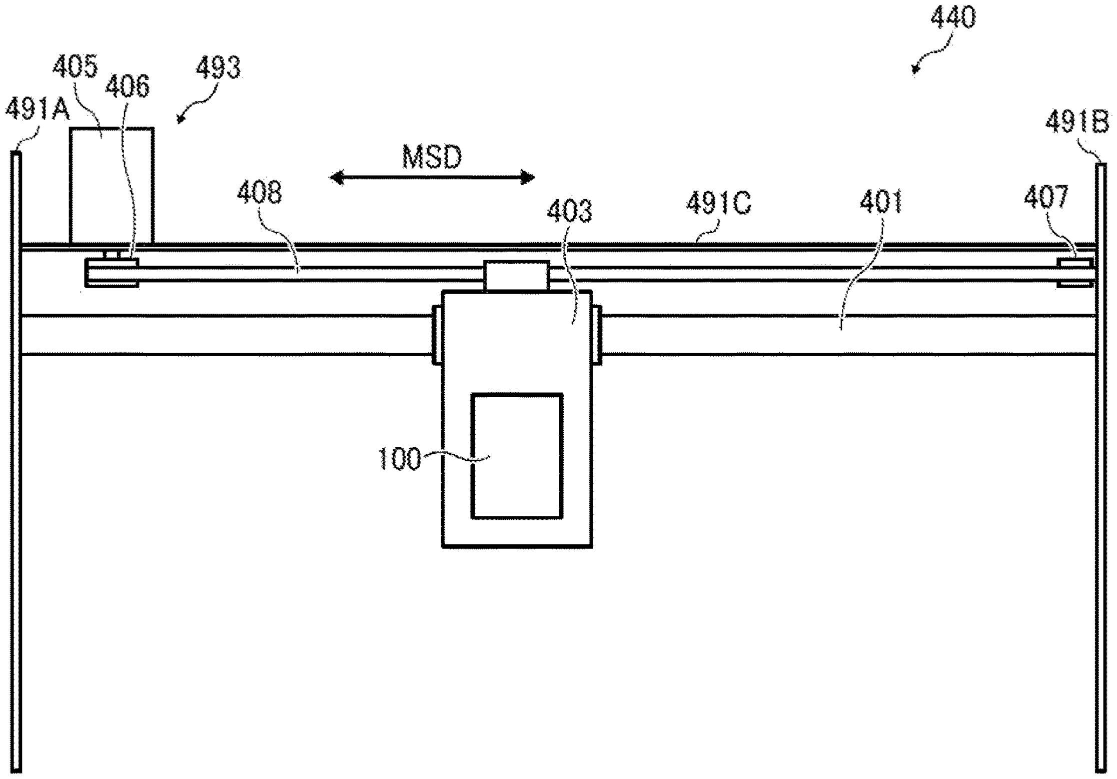
FIG. 11 is a schematic plan view of an example of a liquid discharge device according to embodiments of the present disclosure.

Next, another example of the liquid discharge device 440 according to the present embodiment is described with reference to FIG. 11. FIG. 11 is a plan view of a part of the liquid discharge device 440. The liquid discharge device 440 includes the housing, the main-scanning moving mechanism 493, the carriage 403, and the liquid discharge head 100 among components of the liquid discharge apparatus 1000 described above. The side plates 491A and 491B, and the back plate 491C construct the housing. The liquid discharge device 440 may further include at least one of the maintenance mechanism 420 and the supply mechanism 494, which may be attached to the side plate 491B.

Figure 12:
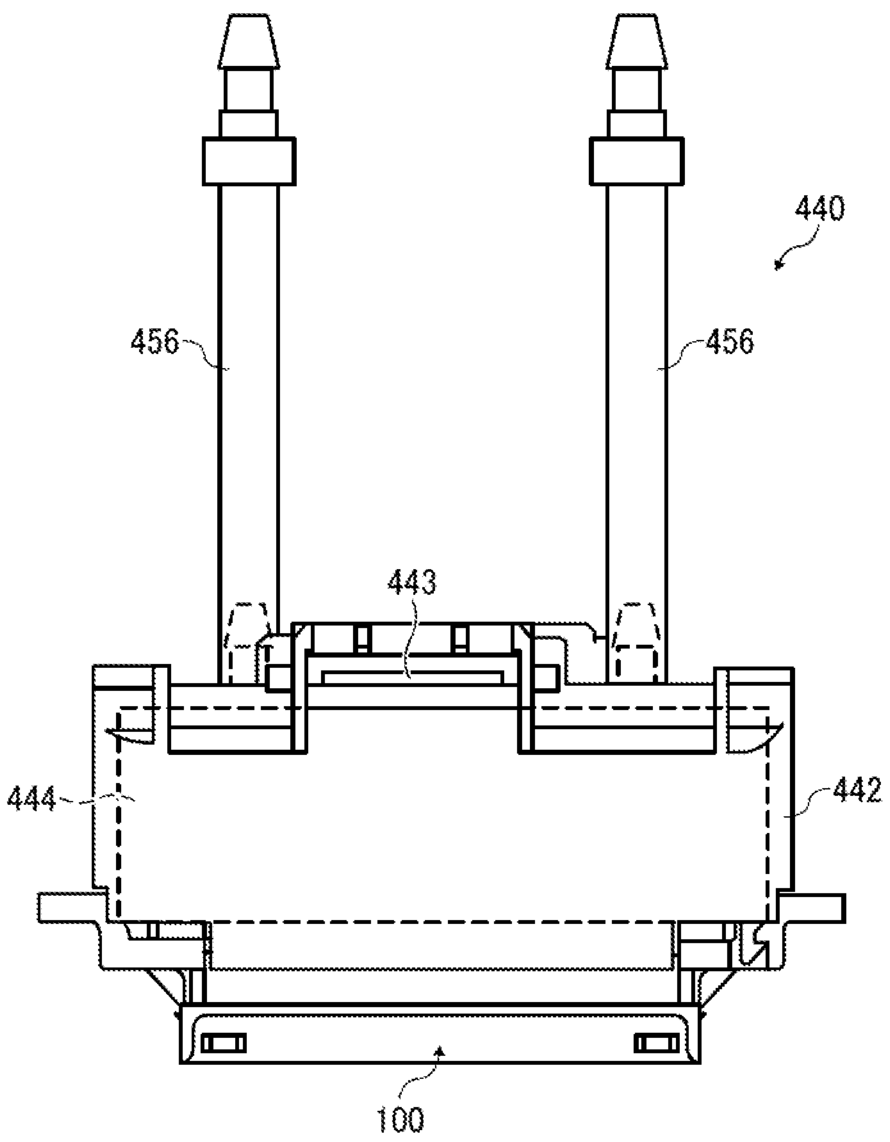
FIG. 12 is a schematic front view of another example of the liquid discharge device according to embodiments of the present disclosure.

Next, another example of the liquid discharge device 440 according to the present embodiment is described with reference to FIG. 12. FIG. 12 is a front view of the liquid discharge device 440. The liquid discharge device 440 includes the liquid discharge head 100 to which a channel component 444 is attached and tubes 456 connected to the channel component 444. The channel component 444 is disposed inside a cover 442. In some embodiments, the liquid discharge device 440 may include the head tank 441 instead of the channel component 444. A connector 443 for electrically connecting to the liquid discharge head 100 is provided on an upper portion of the channel component 444.

In the above-described embodiments, the "liquid discharge apparatus" includes the liquid discharge head or the liquid discharge device and drives the liquid discharge head to discharge liquid. The liquid discharge apparatus may be, for example, an apparatus capable of discharging liquid to a material onto which liquid can adhere or an apparatus to discharge liquid toward gas or into liquid.

The "liquid discharge apparatus" may further include devices relating to feeding, conveying, and ejecting of the material onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers so as to form a three-dimensional object.

The "liquid discharge apparatus" is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The above-described term "material onto which liquid can adhere" represents a material on which liquid is at least temporarily adhered, a material on which liquid is adhered and fixed, or a material into which liquid is adhered to permeate. Specific examples of the "material onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited.

Examples of the "material onto which liquid can adhere" include any materials onto which liquid can adhered even temporarily, such as paper, thread, fiber, fabric, leather, metal, plastic, glass, wood, ceramic, construction materials (e.g., wall paper or floor material), and cloth textile.

Examples of the "liquid" include ink, treatment liquid, DNA sample, resist, pattern material, binder, fabrication liquid, and solution or liquid dispersion containing amino acid, protein, or calcium.

The liquid discharge apparatus may be an apparatus to relatively move the liquid discharge head and the material onto which liquid can adhere. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a paper sheet to apply the treatment liquid to the surface of the paper sheet, for reforming the surface of the paper sheet; and an injection granulation apparatus that injects a composition liquid, in which a raw material is dispersed in a solution, through a nozzle to granulate fine particle of the raw material.

The "liquid discharge device" refers to a liquid discharge head integrated with functional components or mechanisms, i.e., an assembly of components related to liquid discharge. For example, the "liquid discharge device" includes a combination of the liquid discharge head with at least one of a head tank, a carriage, a supply mechanism, a maintenance mechanism, or a main-scanning moving mechanism.

Here, the integrated unit may be, for example, a combination in which the liquid discharge head and a functional part(s) are secured to each other through, e.g., fastening, bonding, or engaging, and a combination in which one of the liquid discharge head and a functional part(s) is movably held by another. The liquid discharge head may be detachably attached to the functional part(s) or unit(s) each other.

Examples of the liquid discharge device include the liquid discharge device 440 in which a liquid discharge head and a head tank are integrated, as illustrated in FIG. 10. Alternatively, the liquid discharge head and the head tank coupled (connected) to each other via a tube or the like may form the liquid discharge device as a single unit. Here, a unit including a filter may further be added to a portion between the head tank and the liquid discharge head of the liquid discharge device.

In another example, the liquid discharge device may be an integrated unit in which a liquid discharge head is integrated with a carriage.

As yet another example, the liquid discharge device is a unit in which the liquid discharge head and the main-scanning moving mechanism are combined into a single unit.

The liquid discharge head is movably held by a guide that is a part of the main-scanning moving mechanism. Like the liquid discharge device 440 illustrated in FIG. 11, the liquid discharge head, the carriage, and the main-scanning moving mechanism may form the liquid discharge device as a single unit.

In another example, the cap that forms a part of the maintenance mechanism is secured to the carriage mounting the liquid discharge head so that the liquid discharge head, the carriage, and the maintenance mechanism are integrated as a single unit to form the liquid discharge device.

Further, in still another example, the liquid discharge device includes tubes connected to the liquid discharge head to which the head tank or the channel component is attached so that the liquid discharge head and the supply mechanism are integrated as a single unit, as illustrated in FIG. 12.

The main-scanning moving mechanism may be a guide only. The supply mechanism may be a tube(s) only or a loading device only.

The liquid discharge head is not limited in the type of pressure generator used. For example, the above-described piezoelectric actuator (which may use a laminated piezoelectric element), a thermal actuator using a thermoelectric transducer such as a thermal resistor, and an electrostatic actuator including a diaphragm and a counter electrode can be used.

In the present specification, the terms "image formation," "recording," "printing," "image printing," and "fabricating" used herein may be used synonymously with each other.

Aspects of the present disclosure are, for example, as follows.

Aspect 1

A liquid discharge head includes a nozzle layer including a piezoelectric layer and having a nozzle penetrating through the nozzle layer, a liquid chamber communicating with the nozzle, and a drive circuit to apply a drive waveform to the piezoelectric layer to drive the piezoelectric layer. The drive waveform has a first waveform and a second waveform. The first waveform has a first voltage to discharge a liquid in the liquid chamber from the nozzle. The first voltage has a first rising edge from which the first voltage rises. The second waveform has a second voltage having a second rising edge from which the second voltage rises. The second rising edge is delayed from the first rising edge by $(m-0.5)\times Tc$, where m represents a positive integer, and Tc represents a natural period of vibration of the piezoelectric layer.

Aspect 2

In Aspect 1, the second voltage of the second waveform further has a falling edge from which the second voltage falls. The falling edge is delayed from the first rising edge by $n\times Tc$, where n represents a positive integer.

Aspect 3

A liquid discharge head includes a nozzle layer including a piezoelectric layer and having a nozzle penetrating through the nozzle layer, a liquid chamber communicating with the nozzle, and a drive circuit to apply a drive waveform to the piezoelectric layer to drive the piezoelectric layer. The drive waveform has a first waveform and a second waveform. The first waveform has a first voltage to discharge a liquid in the liquid chamber from the nozzle. The first voltage has a rising edge from which the first voltage rises. The second waveform has a second voltage having a falling edge from which the second voltage falls. The falling edge is delayed from the rising edge by $n\times Tc$, where n represents a positive integer, and Tc represents a natural period of vibration of the piezoelectric layer.

Aspect 4

In any one of Aspects 1 to 3, the first voltage of the first waveform has a first amplitude. The second voltage of the second waveform has a second amplitude equal to or less than 50% of the first amplitude.

Aspect 5

In any one of Aspects 1 to 4, the drive waveform further has multiple second waveforms including the second waveform. The multiple second waveforms are repeatedly applied to the piezoelectric layer to drive the piezoelectric layer.

Aspect 6

A liquid discharge apparatus includes the liquid discharge head according to any one of Aspects 1 to 5, and a carriage mounting the liquid discharge head and configured to move the liquid discharge head.

As described above, according to the present disclosure, the drive waveform reduces the residual vibration generated in the nozzle layer after a liquid is discharged.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a nozzle layer including a piezoelectric layer and having a nozzle penetrating through the nozzle layer;

a liquid chamber communicating with the nozzle; and a drive circuit configured to apply a drive waveform to the piezoelectric layer to drive the piezoelectric layer, the drive waveform having:

a first waveform having a first voltage to discharge a liquid in the liquid chamber from the nozzle, the first voltage having a first rising edge from which the first voltage rises; and a second waveform having a second voltage having a second rising edge from which the second voltage rises, the second rising edge delayed from the first rising edge by (m−0.5)×Tc, where m represents a positive integer, and Tc represents a natural period of vibration of the piezoelectric layer.

2. The liquid discharge head according to claim 1, wherein the second voltage of the second waveform further has a falling edge from which the second voltage falls, the falling edge delayed from the first rising edge by n×Tc, where n represents a positive integer.

3. The liquid discharge head according to claim 1, wherein the first voltage of the first waveform has a first amplitude; and the second voltage of the second waveform has a second amplitude equal to or less than 50% of the first amplitude.

4. The liquid discharge head according to claim 1, wherein the drive waveform further has multiple second waveforms including the second waveform, the multiple second waveforms repeatedly applied to the piezoelectric layer to drive the piezoelectric layer.

5. A liquid discharge apparatus comprising:

the liquid discharge head according to claim 1; and a carriage mounting the liquid discharge head and configured to move the liquid discharge head.

* * * * *